United States Patent
Centonza et al.

(10) Patent No.: US 11,751,269 B2
(45) Date of Patent: Sep. 5, 2023

(54) METHODS PROVIDING UE STATE INDICATION UPON DELIVERY FAILURE AND RELATED NETWORKS AND NETWORK NODES

(71) Applicant: TELEFONAKTIEBOLAGET LM ERICSSON (PUBL), Stockholm (SE)

(72) Inventors: Angelo Centonza, Stockholm (SE); Paul Schliwa-Bertling, Ljungsbro (SE); Qian Chen, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 533 days.

(21) Appl. No.: 16/631,918

(22) PCT Filed: Aug. 22, 2018

(86) PCT No.: PCT/IB2018/056374
§ 371 (c)(1),
(2) Date: Jan. 17, 2020

(87) PCT Pub. No.: WO2019/038702
PCT Pub. Date: Feb. 28, 2019

(65) Prior Publication Data
US 2020/0163146 A1 May 21, 2020

Related U.S. Application Data

(60) Provisional application No. 62/549,188, filed on Aug. 23, 2017.

(51) Int. Cl.
*H04W 76/18* (2018.01)
*H04W 76/25* (2018.01)
(Continued)

(52) U.S. Cl.
CPC ........... *H04W 76/18* (2018.02); *H04W 8/08* (2013.01); *H04W 48/16* (2013.01);
(Continued)

(58) Field of Classification Search
CPC ....... H04W 76/18; H04W 8/08; H04W 48/16; H04W 68/005; H04W 76/25; H04W 92/10; H04W 76/27
See application file for complete search history.

(56) References Cited

U.S. PATENT DOCUMENTS

2010/0265884 A1* 10/2010 Vikberg ............... H04W 72/23
370/328
2013/0039339 A1* 2/2013 Rayavarapu .......... H04W 76/19
370/329
(Continued)

FOREIGN PATENT DOCUMENTS

WO WO-2018147698 A1 * 8/2018 ........... H04L 5/0055

OTHER PUBLICATIONS

Ericsson, "RRC Inactive state—new procedures", SA WG2 Meeting #120, Busan, Korea, Mar. 27-31, 2017, pp. 1-4, S2-172299.
(Continued)

*Primary Examiner* — Jael M Ulysse
(74) *Attorney, Agent, or Firm* — Sage Patent Group

(57) ABSTRACT

Systems, methods, and apparatus for operating RAN and CN nodes are disclosed. An example method of operating a RAN node includes receiving, from a CN node, a PDU for a wireless device that is in an inactive state. The RAN node pages the wireless device in response to receiving the PDU from the CN node. The RAN node sends a non-delivery message to the CN node in response to failure of the paging for the wireless device, where the non-delivery message includes an indication that the wireless device is in the inactive state.

(Continued)

An example method of operating a CN node includes the CN node sending a PDU for a wireless device to a RAN node. The CN node then receives a non-delivery message from the RAN node, where the non-delivery message includes an indication that the wireless device is in an inactive state.

20 Claims, 13 Drawing Sheets

(51) Int. Cl.
    *H04W 76/27*     (2018.01)
    *H04W 8/08*     (2009.01)
    *H04W 48/16*     (2009.01)
    *H04W 68/00*     (2009.01)
    *H04W 92/10*     (2009.01)

(52) U.S. Cl.
    CPC ......... *H04W 68/005* (2013.01); *H04W 76/25* (2018.02); *H04W 76/27* (2018.02); *H04W 92/10* (2013.01)

(56) References Cited

U.S. PATENT DOCUMENTS

| | | | |
|---|---|---|---|
| 2014/0029594 A1* | 1/2014 | Lee | H04W 48/12 370/336 |
| 2015/0016323 A1* | 1/2015 | Sundararajan | H04W 52/0209 370/311 |
| 2015/0223197 A1* | 8/2015 | Kim | H04W 68/02 455/458 |
| 2015/0327032 A1* | 11/2015 | Hedman | H04W 76/38 370/329 |
| 2016/0183156 A1* | 6/2016 | Chin | H04W 36/38 370/331 |
| 2016/0262041 A1* | 9/2016 | Ronneke | H04W 52/0216 |
| 2017/0311290 A1* | 10/2017 | Adjakple | H04W 76/18 |
| 2018/0270188 A1* | 9/2018 | Kodaypak | H04L 63/0428 |
| 2018/0270895 A1* | 9/2018 | Park | H04W 24/04 |
| 2019/0021069 A1* | 1/2019 | Chun | H04W 76/10 |
| 2019/0149365 A1* | 5/2019 | Chatterjee | H04L 25/0226 370/329 |
| 2019/0230625 A1* | 7/2019 | Kim | H04W 68/08 |
| 2019/0349886 A1* | 11/2019 | Lee | H04W 76/28 |
| 2019/0357295 A1* | 11/2019 | Kim | H04L 5/0055 |

OTHER PUBLICATIONS

Qualcomm Incorpoarted, RRC_Inactive Principles, 3GPP TSG-RAN WG3 Meeting #96, Hangzhou, China, May 15-19, 2017, pp. 1-4, R3-171799, 3GPP.

* cited by examiner

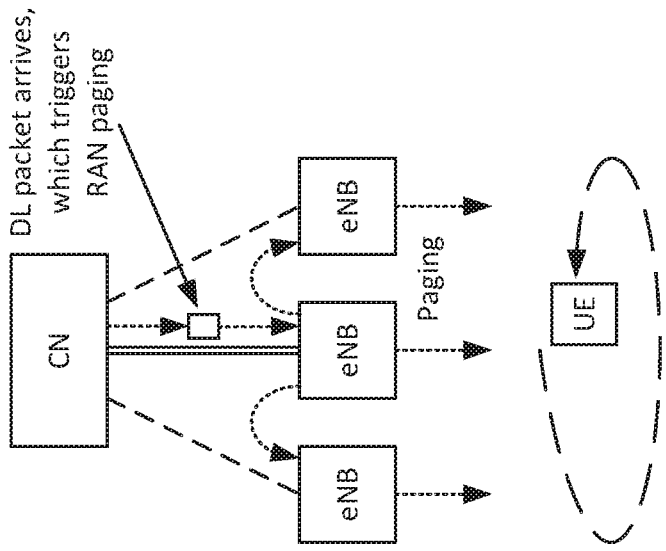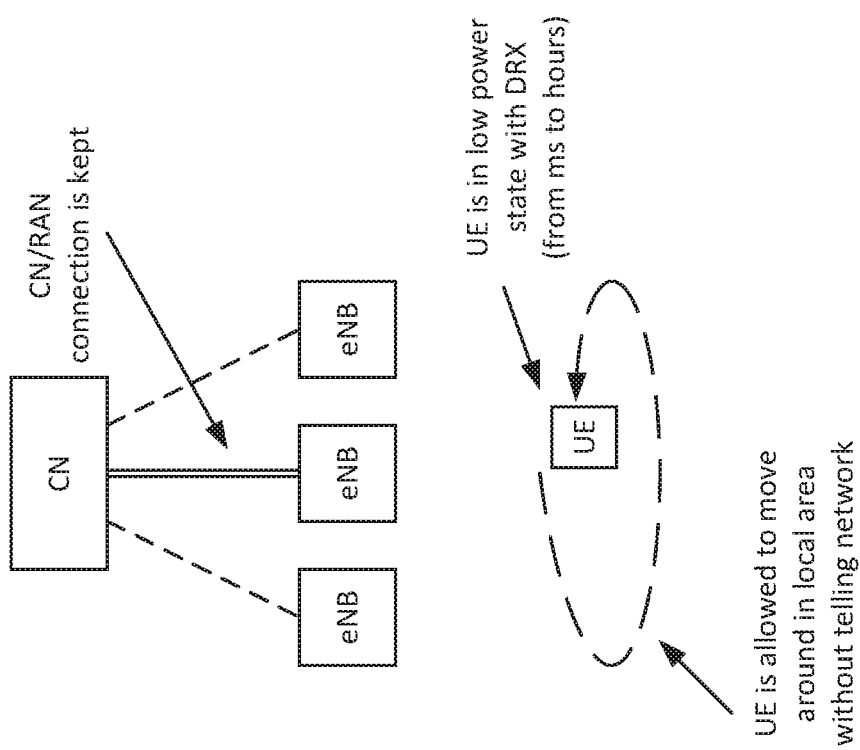

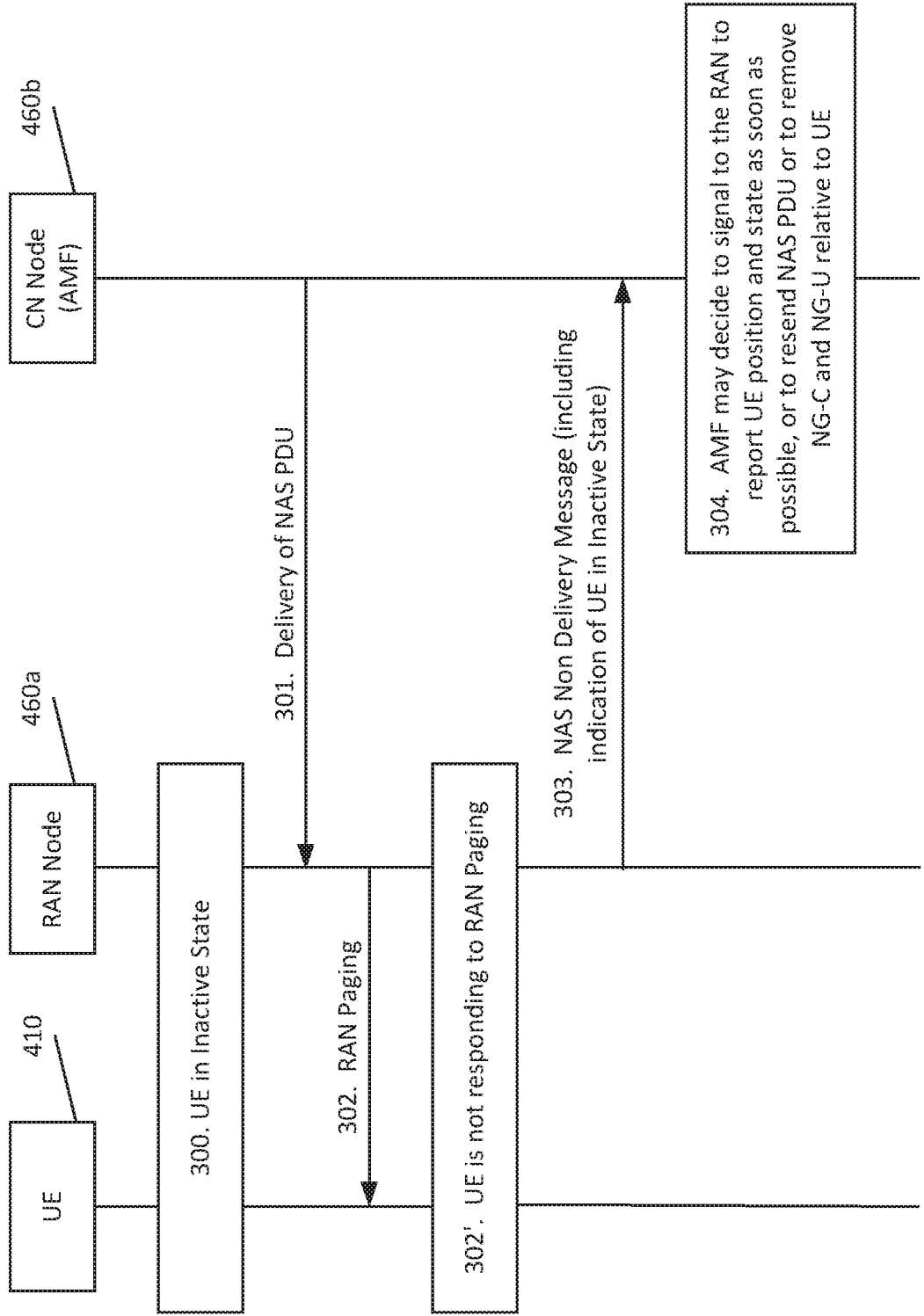

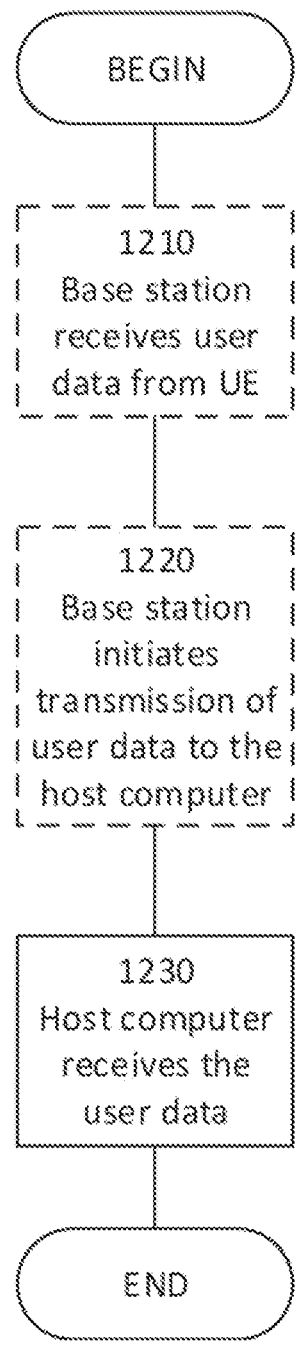

METHODS PROVIDING UE STATE INDICATION UPON DELIVERY FAILURE AND RELATED NETWORKS AND NETWORK NODES

RELATED APPLICATIONS

This application is a 371 application of International Application No. PCT/IB2018/056374, filed Aug. 22, 2018, which claims the benefit of U.S. Provisional Application No. 62/549,188, filed Aug. 23, 2017, the disclosures of which are fully incorporated herein by reference.

TECHNICAL FIELD

The present disclosure relates generally to communications, and more particularly, to wireless communication methods, networks, and network nodes.

BACKGROUND

The current 5th Generation 5G system architecture is described in 3GPP TS 23.501 v1.2.0, (2017-07), Technical Specification Group Services and System Aspects; System Architecture for the 5G System; Stage 2 (Release 15). FIG. 1 provides an illustration of the 5G system architecture from 3GPP TS 23.501 v1.2.0. The Next Generation NG application layer protocol used over the N2 interface for the control plane is called NG AP. In this document, the N2 interface in FIG. 1 will also be referred to as NG-C(NG control plane) interface, while the N3 interface will also be referred to as NG-U (NG user plane) interface.

In 5G and in Long Term Evolution LTE it may be possible to move a UE (also referred to as a wireless device) to the so-called inactive state. In this state, Access Stratum (AS) resources are removed. However, a UE context is kept/maintained in the Radio Access Network RAN. Also, to the Core Network CN, the UE is treated as active. Namely, the N2 and N3 interfaces (S1-C and S1-U for LTE) pertinent to UE communication are maintained. The UE, however, may behave as if it was in Idle mode, namely, the UE will not signal to the RAN except in specific cases, to denote special mobility events.

It is currently specified that the core network CN is not aware of whether a UE is in Inactive mode. Note that Inactive State and Inactive Mode are equivalently used to indicate a UE that is inactive. Therefore, the transition from inactive to active state in the RAN will be transparent to the CN.

In the downlink (DL), this means for the default solution that DL packets will be sent to the last node where the UE was connected (anchor RAN node). That node will then be responsible for initiating UE paging within the paging area that the UE is allowed to move in without notifying the network.

In the uplink (UL), this means that the UE may need to perform a RAN-level procedure to transition to active state to transmit data. In case the UE has moved to a different RAN node, this RAN node will most likely need to fetch the UE context from another RAN node, and if needed, notify the CN that the UE has moved to a new node.

If the UE moves outside the paging area, it may need to notify the network about the mobility so that the paging area can be updated. This procedure could trigger a RAN node relocation, or the RAN node can be kept.

The following RAN functions are envisioned:
Paging for DL data;
Context fetch to handle moving UEs (may be similar to existing LTE procedure); and
Mobility updating (possible this could use a mechanism similar to context fetch).

In order for these mechanisms to be enabled, the UE may need to be allocated a RAN identifier uniquely identifying the UE context in the RAN. In case there is any failure where it is not possible to retrieve the UE RAN context, it may be assumed that the RAN context can be rebuilt as would happen in the case of a new connection setup.

FIGS. 2A and 2B illustrate principles involved in management of inactive state/mode UEs. In the inactive state shown in FIG. 2A, the UE is in a low power mode with discontinuous reception DRX (e.g., for milliseconds (ms) to hours), and a CN/RAN connection is kept/maintained between the CN and the anchor RAN node for the UE. In this state, the UE is allowed to move around in the local area without telling the network.

There may currently exist certain challenges with Inactive Mode UEs. In current LTE and 5G systems, the CN may need to deliver a Non-Access Stratum (NAS) packet to the UE while the UE is in Inactive mode. Upon reception of the NAS Packet Data Unit (PDU), the RAN would start paging the UE in Inactive mode, as shown in FIG. 2B.

However, the UE may not respond to the RAN paging, for example, because the UE is not in coverage of the paging RAN. This may mean that for a certain time the RAN will not be able to page the UE, i.e., the UE may not be able to move to active state to receive the NAS PDU.

As the CN is unaware of the fact the UE is inactive, it may start re-sending the NAS PDU. However, this may be inefficient because the RAN may still be in the process of paging the UE. If paging eventually succeeds, the RAN may be able to send the very first instance of the NAS PDU and also the re-sent NAS PDU(s) from the CN, and this may create unnecessary signaling and may complicate handling at the UE side.

Another problem could be that the RAN, after attempting in vain to contact the UE via paging, may send a NAS Non-Delivery Message to the CN. Such a message may be present both on the S1 Application Protocol (S1AP) and NG Application Protocol (NGAP). In this case, the CN may trigger removal of the RAN-CN interfaces for the UE (e.g., NG-U, NG-C). This, however, may be an inefficient decision because the UE may re-emerge from lack of coverage and it may reconnect to the network, in which case the network may need to re-establish the interfaces that were previously removed.

SUMMARY

According to some embodiments of inventive concepts, a method of operating a radio access network (RAN) node may be provided. A packet data unit (PDU) may be received for a wireless device that is in an inactive state. Moreover, the PDU may be received from a core network (CN) node. The wireless device may be paged in response to receiving the PDU, and a non-delivery message may be sent to the CN node in response to failure of the paging for the wireless device. Moreover, the non-delivery message may include an indication that the wireless device is in the inactive state.

According to some other embodiments of inventive concepts, a method of operating a core network (CN) node may be provided. A packet data unit (PDU) for a wireless device may be sent to a radio access network (RAN) node. A non-delivery message may be received from the RAN node after sending the PDU for the wireless device, and the non-delivery message may include an indication that the wireless device is in an inactive state.

According to some embodiments, by providing a non-delivery message including an indication that the wireless device is in the inactive state, the CN node may more efficiently handle PDU procedures when paging fails.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 2A and 2B are diagrams illustrating management of Inactive Mode UEs;

FIG. 3 is a message diagram illustrating operations/messages in a wireless communication network according to some embodiments of inventive concepts;

FIG. 12 is a flow chart illustrating methods implemented in a communication system including a host computer, a base station and a user equipment according to some embodiments of inventive concepts;

DETAILED DESCRIPTION

Figure 1:
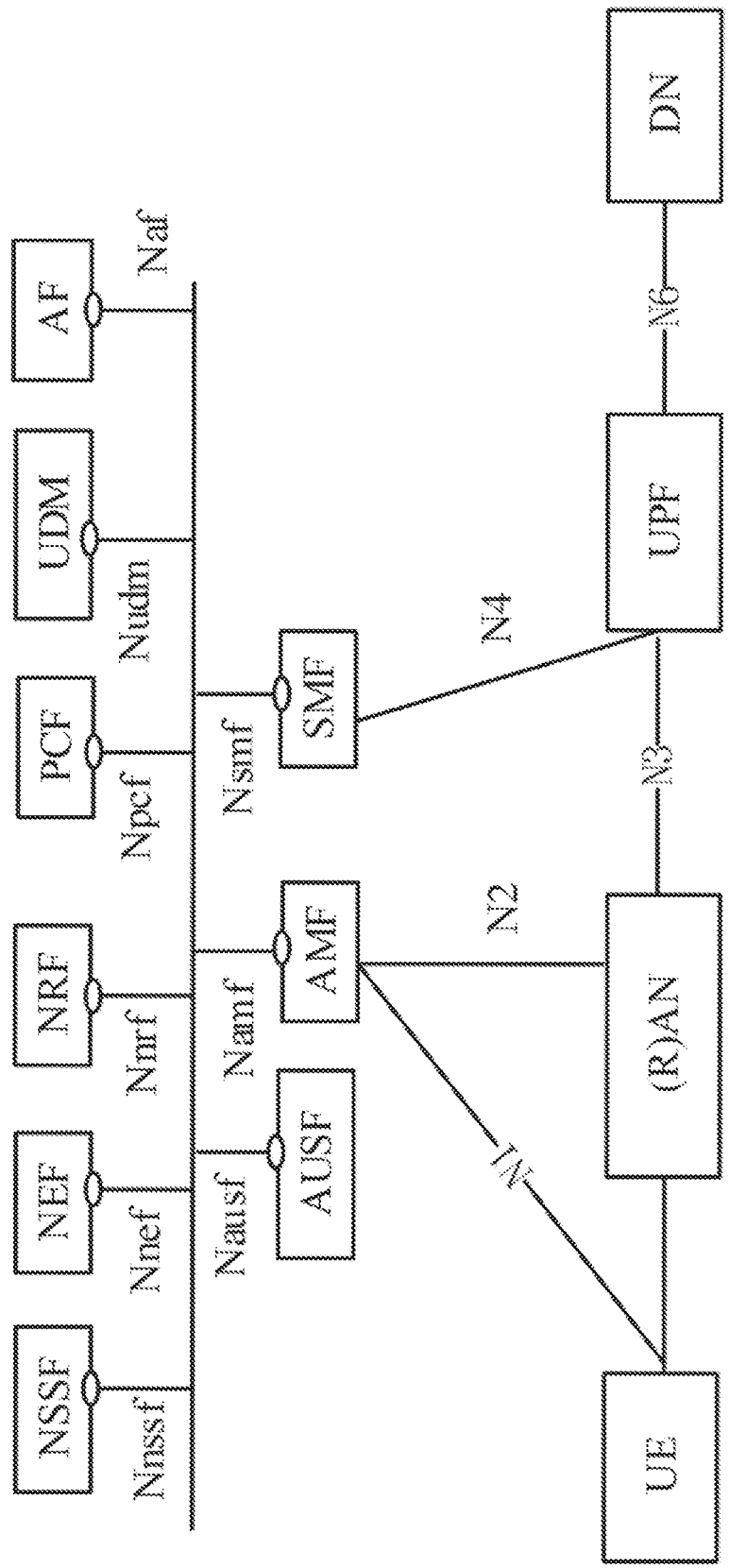
FIG. 1 is a block diagram illustrating a 5G architecture as described in 3GPP TS 23.501 v1.2.0.

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

A problem triggering behaviors discussed above may be that the CN, in cases of delayed or failed delivery of NAS PDUs, is not aware of whether the UE is inactive or not. According to some embodiments, knowledge of whether the UE is inactive or not may enable the CN to adopt smart procedures, for example, aimed at better handling retransmissions, interface removal, and/or other communication processing.

Certain aspects of the present disclosure and their embodiments may provide solutions to these and/or other challenges. In this disclosure, upon failure in contacting the UE for the delivery of a NAS PDU, the RAN may inform the CN of the fact that the NAS PDU was not delivered and that the UE is in an Inactive state. According to certain embodiments, the RAN may also indicate if the CN shall refrain from sending the NAS PDU delivery (including re-sending) for a certain period in case the RAN considers the paging load is high or the paging shall not be re-tried in a certain period of time after several times of paging failure at RAN side.

There are, proposed herein, various embodiments which may address one or more of the issues disclosed herein. Certain embodiments may provide one or more of the following technical advantages. Some embodiments may allow the radio access network RAN node 460a (e.g., gNB) to remove a radio leg that is unstable (e.g., subject to frequent outages) while reducing/minimizing cases when the wireless device UE 410 is left without connectivity. Some embodiments may also provide a way for the RAN node 460a to convey useful/necessary information to the CN node 460b to make a proper decision on handling of NAS PDU procedure, when RAN paging fails. Other technical advantages may also be provided, and certain embodiments may provide some, none, or all of the advantages listed above.

According to certain embodiments, when a wireless device UE 410 is in the Inactive state and the CN node 460b needs to contact the wireless device UE 410 by sending to it a NAS PDU, the CN node 460a will forward the NAS PDU to the RAN node 460a. At this point the RAN node 460a will attempt to contact the wireless device UE 410 and let the wireless device UE 410 move to Active state.

As part of this embodiment, the CN node 460b may not re-send the NAS PDU until the RAN node 460a has responded to the CN node 460b in a specific manner, including, but not limited to the following:

With a wireless device UE 410 associated message eventually containing a NAS PDU from the wireless device UE 410; and/or With a wireless device UE 410 associated message notifying the CN node 460b that the NAS PDU was not delivered.

According to certain embodiments, the RAN node 460a will try to reach the wireless device UE 410 for a preconfigured time. If the wireless device UE 410 is not reachable (e.g., the wireless device UE 410 does not respond to RAN paging and the RAN node 460a cannot send the NAS PDU to the wireless device UE 410), the RAN node 460a will generate a NAS Non-Delivery message that is transmitted towards the CN node 460b. Such a NAS Non-Delivery Message will contain an indication that the wireless device UE 410 is in an inactive state.

The CN node 460b receiving the NAS Non-Delivery message may take into account the Inactive State notification to make an appropriate decision, including, but not limited to the following:

Decide whether to re-send the NAS PDU to the RAN node 460a. For example, the CN node 460b may decide to re-send the NAS PDU after a period of time following reception of NAS Non-Delivery message that is longer than the retransmission time the CN node 460b will usually adopt, based on a refrain indication from RAN side.

Decide not to send the NAS PDU and to notify the RAN node 460a to report parameters such as wireless device UE 410 state and location as soon as the wireless device UE 410 communicates with the RAN node 460b.

Decide to remove the NG-C and NG-U interfaces associated to the wireless device UE 410. This might be due to a long period of time having passed from the delivery of the NAS PDU to the RAN node 460a to the reception of the NAS Non-Delivery message.

A Message sequence chart illustrating a method according to some embodiments is provided in FIG. 3.

Operation 300. Wireless device UE 410 enters CM-CONNECTED and RRC Inactive state. Access and Mobility Function (AMF) CN node 460b maintains wireless device UE 410 at CM-CONNECTED state and is unaware that the wireless device UE 410 is in the inactive state (i.e., treats the wireless device UE 410 as being active). The RAN node 460a maintains the wireless device UE 410 context after the wireless device UE 410 enters the inactive state.

Operation 301. AMF CN node 460b sends a DL NAS PDU for the inactive state wireless device UE 410 on the existing NG-C connection for the inactive state wireless device UE 410 towards RAN node 460b.

Operation 302. RAN node 460b initiates paging the inactive state wireless device UE 410 based on a local formulated paging profile.

Operation 303. Due to whatever reason, the inactive state wireless device UE 410 may fail to respond to the RAN paging.

Operation 304. When RAN node 460a considers that paging has failed after paging timeout and no wireless device UE 410 response is received, RAN node 460a sends a NAS Non-Delivery Message (also referred to as a NAS Non-Delivery Indication) to AMF CN node 460b indicating the failure and may also include the current wireless device UE 410 RRC state info and an indication if NAS PDU shall be refrained for a certain time.

Operation 305. AMF CN node 460b may take different actions based on the info received from RAN node 460a, as described above.

It will be appreciated that the message sequence shown in FIG. 3 is for purposes of example, and other embodiments may modify the steps and/or order of the steps without deviating from the scope of inventive concepts. Furthermore, it will be appreciated that the RAN Node 460a and AMF CN node 460b may be embodied in any suitable network node (e.g., gNB, MME, etc.) as described in more detail below.

Operations of RAN node 460a (e.g., a base station, eNB, gNB, etc.) of a wireless communication network will now be discussed with reference to the flow chart of FIG. 13. For example, RAN node 460a may be implemented using structure of network node 460 from FIG. 4 with instructions stored in device readable medium 480 of RAN node 460a so that when instructions of device readable medium 480 of RAN node 460a are executed by processing circuitry 470 of RAN node 460a, processing circuitry 470 of RAN node 460a performs respective operations discussed below with respect to FIG. 13. Processing circuitry 470 of RAN node 460a may thus transmit and/or receive communications to/from one or more other network nodes/entities/servers of a wireless communication network (e.g., CN node 460b) through interface 490 of RAN node 460a (e.g., using port(s)/terminal(s) 494). In addition, processing circuitry 470 of RAN node 460a may transmit and/or receive communications to/from one or more wireless devices (e.g., wireless device UE 410) through interface 490 of RAN node 460a (e.g., using RF transceiver circuitry 472, baseband circuitry 474, and/or radio front end circuitry 492).

At block 1301, processing circuitry 470 of RAN node 460a may maintain a context for wireless device 410 in the inactive state as discussed above, for example, with respect to operation 300 of FIG. 3. The inactive state may be a Radio Resource Control RRC inactive state, and wireless device 410 may be in a CM-Connected and RRC inactive state.

At block 1303, processing circuitry 470 of RAN node 460a may receive a packet data unit PDU (e.g., a non-access stratum NAS PDU) for wireless device 410 that is in the inactive state as discussed above, for example, with respect to operation 301 of FIG. 3. For example, processing circuitry 470 of RAN node 460a may receive the PDU from core network CN node 460b through interface 490 of RAN node 460a (e.g., using port(s)/terminal(s) 494). CN node 460b, for example, may be an Access and Mobility Function AMF node.

At block 1305, processing circuitry 470 of RAN node 460a may page wireless device 410 in response to receiving the PDU as discussed above, for example, with respect to operation 302 of FIG. 3. For example, processing circuitry 470 of RAN node 460a may transmit one or more pages for wireless device 410 through interface 490 of RAN node 460a (e.g., using baseband circuitry 474, RF transceiver circuitry 472, and/or radio front end circuitry 492).

At block 1307, processing circuitry 470 of RAN node 460a may send a non-delivery message (e.g., a NAS non-delivery message) to CN node 460b in response to failure of the paging for wireless device 410 as discussed above, for example, with respect to operation 303 of FIG. 3. Moreover, the non-delivery message may include an indication that wireless device 410 is in the inactive state. For example, processing circuitry 470 of RAN node 460a may send the non-delivery message to CN node 460b through interface 490 of RAN node 460a (e.g., using port(s)/terminal(s) 494).

The non-delivery message may indicate that the PDU was not delivered to wireless device 410.

The non-delivery message may include an instruction for CN node 460b to refrain from resending the PDU for wireless device 410. For example, the instruction for CN node 460b to refrain from resending may be an instruction for CN node 460b to refrain from resending the PDU for wireless device 410 for a period of time following the non-delivery message. Moreover, the non-delivery message may include the instruction for the node of the CN to refrain from resending the PDU for wireless device 410 in response to a high paging load and/or in response to multiple failures of paging for wireless device 410.

The failure of the paging may be determined in response to failure to receive a response from wireless device 410 at RAN node 460a after initiating the paging. For example, the failure of the paging may be determined in response to failure to receive a response from wireless device 410 at RAN node 460a for a preconfigured time after initiating the paging.

Figure 13:
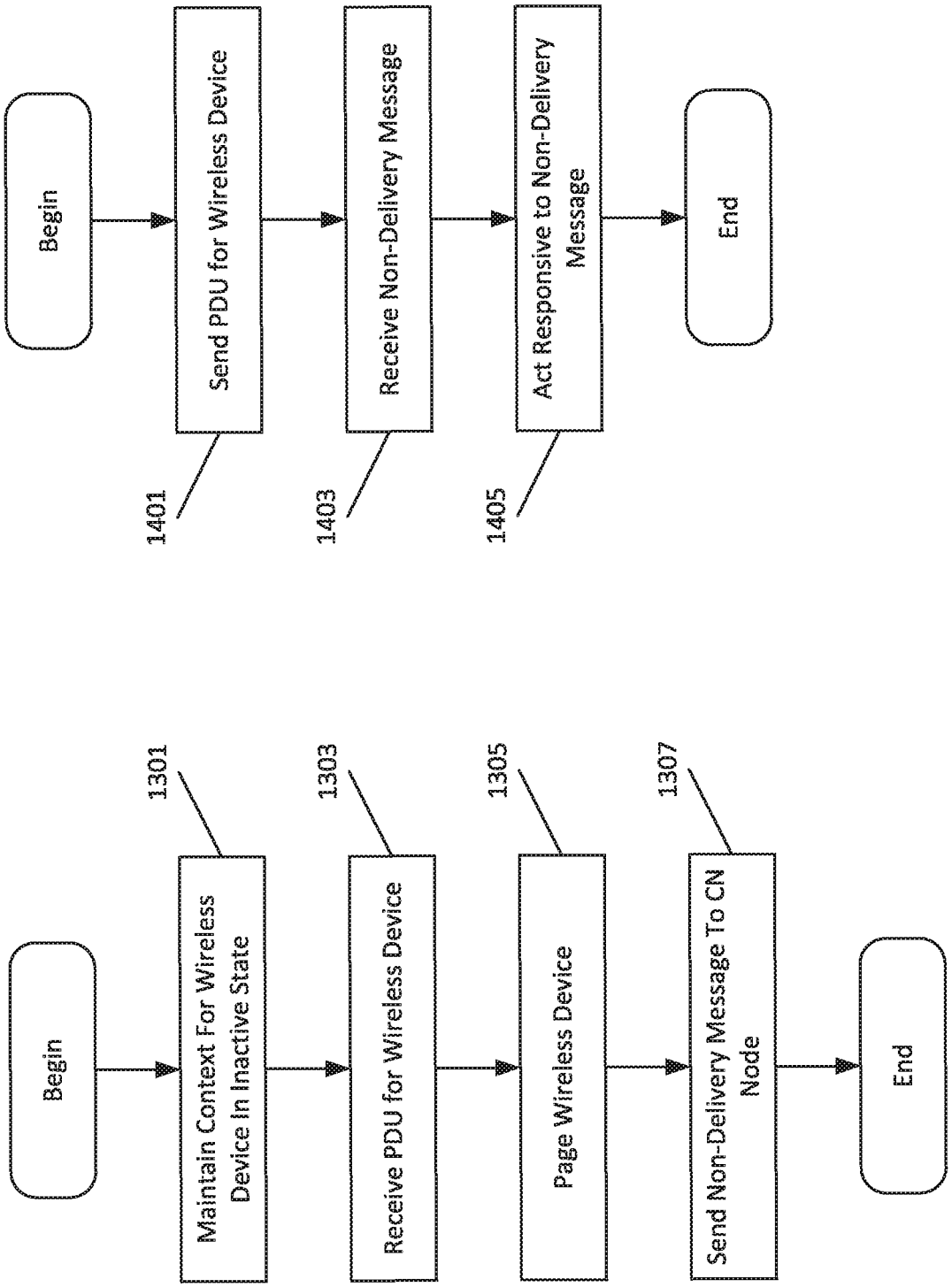
FIG. 13 is a flow chart illustrating operations of a radio access node according to some embodiments of inventive concepts.

Various operations of FIG. 13 may be optional with respect to some embodiments. For example, operations of block 1301 of FIG. 13 may be optional according to some embodiments.

Operations of CN node 460b (e.g., an AMF node) of a wireless communication network will now be discussed with reference to the flow chart of FIG. 14. For example, CN node 460b may be implemented using structure of network node 460 from FIG. 4 with instructions stored in device readable medium 480 of CN node 460b so that when instructions of device readable medium 480 of CN node 460b are executed by processing circuitry 470 of CN node 460b, processing circuitry 470 of CN node 460b performs respective operations discussed below with respect to FIG. 14. Processing circuitry 470 of CN node 460b may thus transmit and/or receive communications to/from one or more other network nodes/entities/servers of a wireless communication network (e.g., RAN node 460a) through interface 490 of CN node 460b (e.g., using port(s)/terminal(s) 494). Because CN node 460b may communicate indirectly with wireless devices through one or more RAN nodes, RF transceiver circuitry 472, baseband circuitry 474, and/or radio front end circuitry 492 of FIG. 4 may be omitted from CN node 460b.

At block 1401, processing circuitry 470 of CN node 460b may send a packet data unit PDU (e.g., a non-access stratum NAS PDU) for wireless device 410 to radio access network RAN node 460a (e.g., a base station) as discussed above, for example, with respect to operation 301 of FIG. 3. Processing circuitry 470 of CN node 460b may send the PDU for wireless device 410 to RAN node 460a through interface 490 of CN node 460b (e.g., using port(s)/terminal(s) 494).

At block 1403, processing circuitry 470 of CN node 460b may receive a non-delivery message (e.g., a NAS non-delivery message) from RAN node 460a after sending the PDU for wireless device 410 as discussed above, for example, with respect to operation 303 of FIG. 3. Processing circuitry 470 of CN node 460b may receive the non-delivery message from RAN node 460a through interface 490 of CN node 460b (e.g., using port(s)/terminal(s) 494). Moreover, the non-delivery message may include an indication that wireless device 410 is in an inactive state (e.g., a CM-connected and Radio Resource Control RRC inactive state). Moreover, the non-delivery message may indicate that the PDU was not delivered to wireless device 410.

The non-delivery message may include an instruction for CN node 460b to refrain from resending the PDU for wireless device 410. For example, the instruction for CN node 460b to refrain from resending may be an instruction for CN node 460b to refrain from resending the PDU for wireless device 410 for a period of time following the non-delivery message.

At block 1405, processing circuitry 470 of CN node 460b may act responsive to the non-delivery message as discussed above, for example with respect to operation 304 of FIG. 3.

According to some embodiments at block 1405, processing circuitry 470 of CN node 460b may remove an interface for wireless device 410 between RAN node 460a and the core network in response to the non-delivery message. Removing an interface, for example, may include removing at least one of a Next Generation Control Plane (NG-C) interface and an NG User Plane (NG-U) interface for wireless device 410 in response to the non-delivery message.

According to some other embodiments at block 1405, processing circuitry 470 of CN node 460b may refrain from resending the PDU for wireless device 410 in response to the non-delivery message. Processing circuitry 470 of CN node 460b may refrain from resending the PDU by refraining from resending the PDU for a period of time following the non-delivery message, and then resending the PDU after the period of time following the non-delivery message.

According to still other embodiments at block 1405, processing circuitry 470 of CN node 460b may send a request to RAN node 460a in response to the non-delivery message, and the request may include a request for at least one parameter regarding wireless device 410 when wireless device 410 communicates with the radio access network. For example, the at least one parameter regarding wireless device 410 may include at least one of a parameter regarding a location of wireless device 410 and a parameter regarding a state of wireless device 410.

Figure 14:
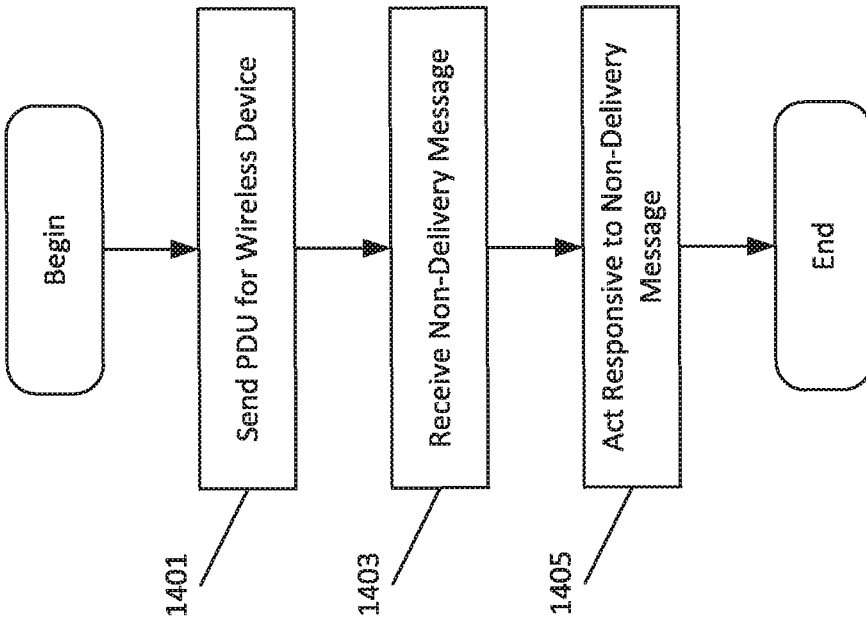
FIG. 14 is a flow chart illustrating operations of a core network node according to some embodiments of inventive concepts.

Various operations of FIG. 14 may be optional with respect to some embodiments. For example, operations of block 1405 of FIG. 14 may be optional according to some embodiments.

Figure 4:
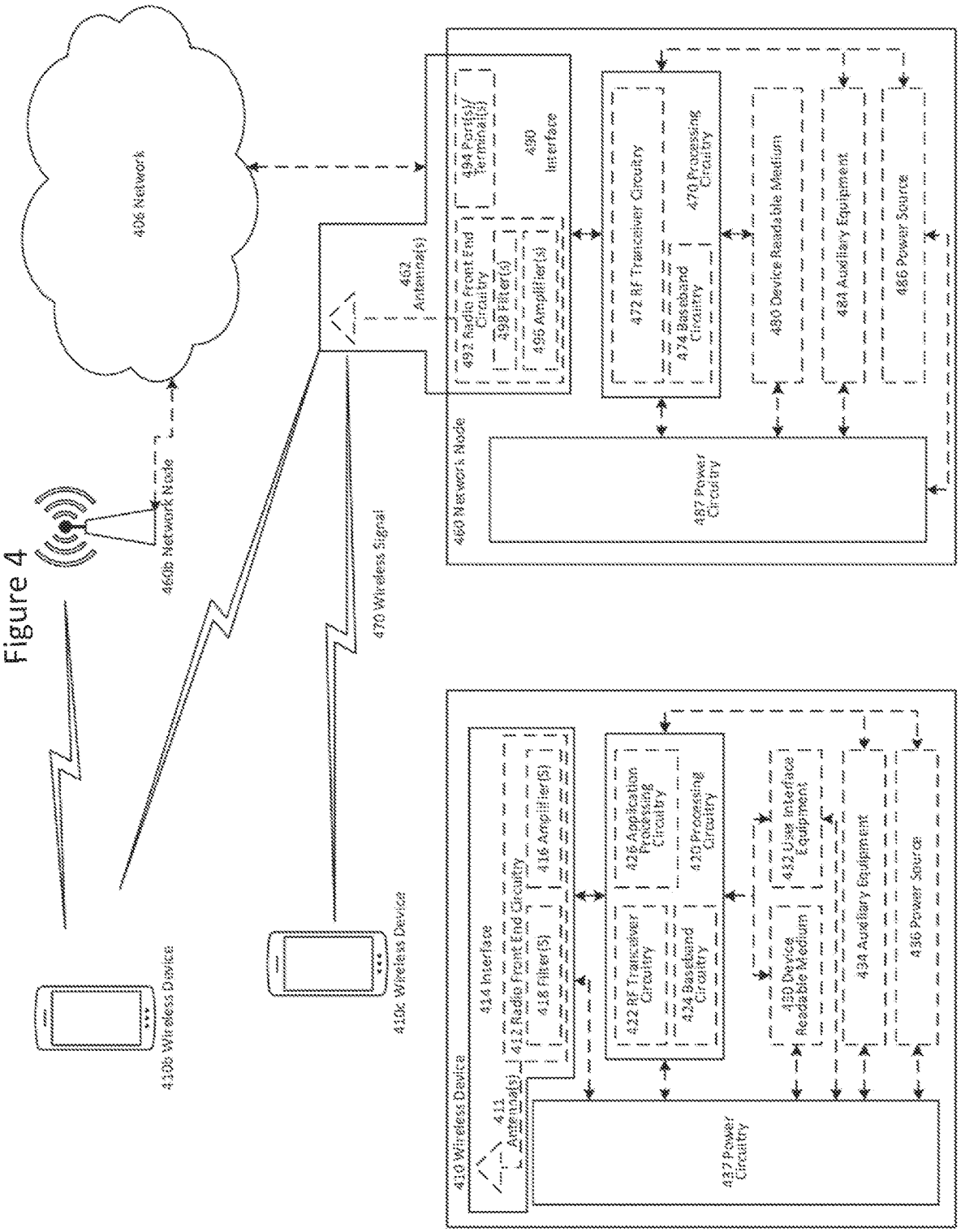
FIG. 4 is a schematic diagram illustrating a wireless network including wireless devices and network nodes according to some embodiments of inventive concepts.

FIG. 4 is a diagram illustrating a wireless network in accordance with some embodiments of inventive concepts.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software used/needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487.

The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality useful/necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
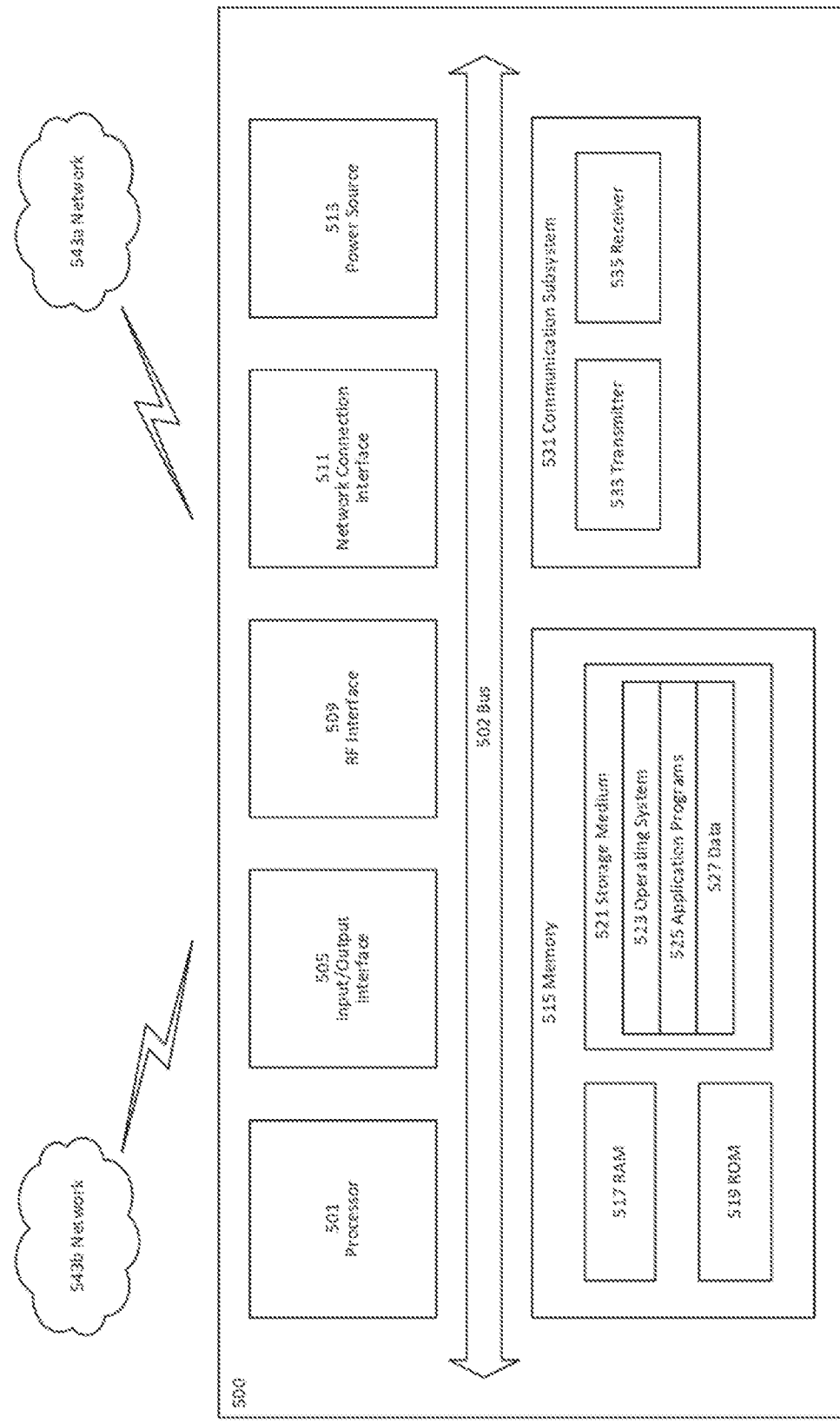
FIG. 5 is a block diagram illustrating a user equipment UE (also referred to as wireless device) according to some embodiments of inventive concepts.

FIG. 5 is a diagram illustrating a user Equipment in accordance with some embodiments of inventive concepts.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543*a*. Network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
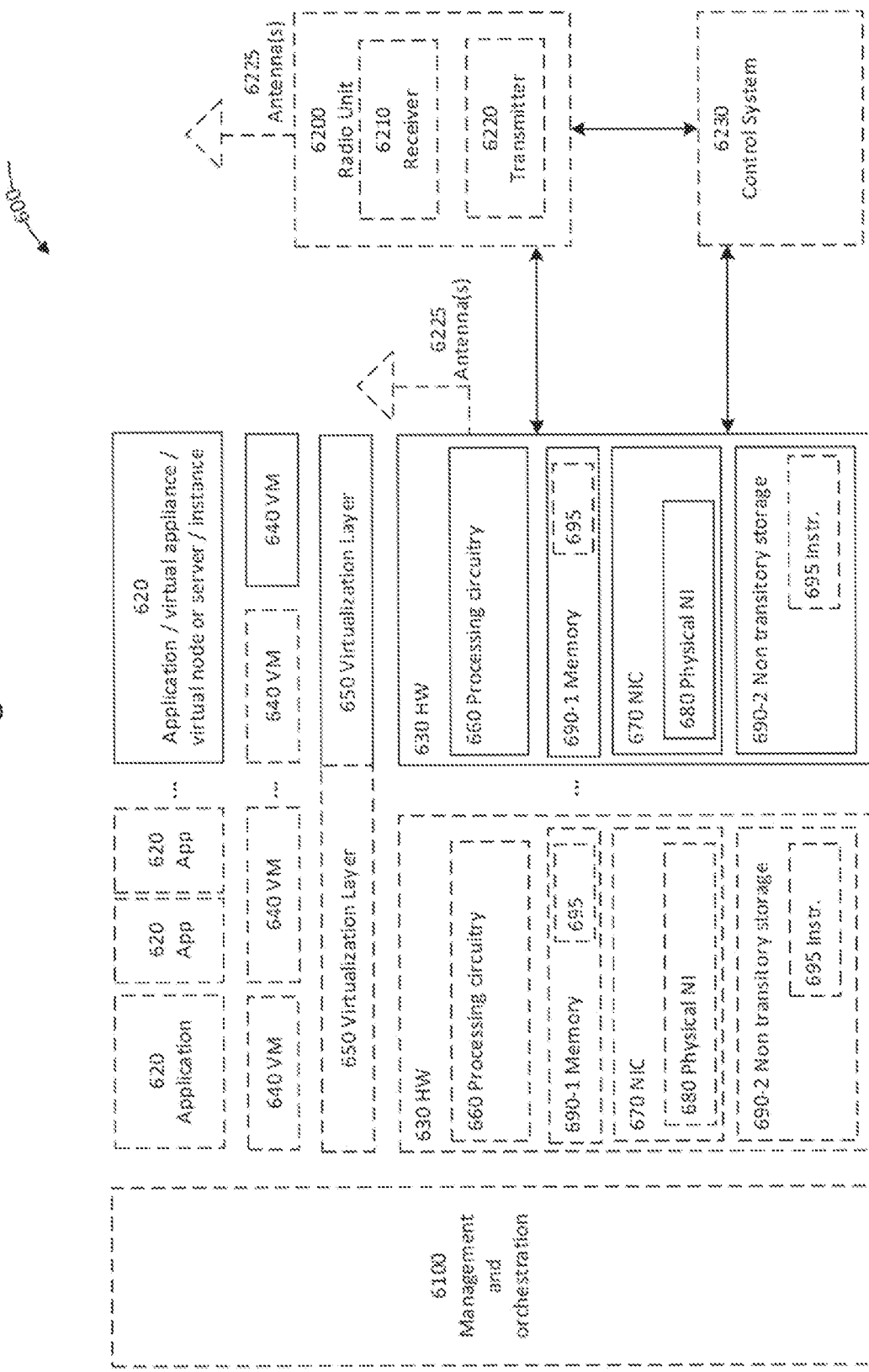
FIG. 6 is a block diagram illustrating a virtualization environment according to some embodiments of inventive concepts.

FIG. 6 is a diagram illustrating a virtualization environment in accordance with some embodiments of inventive concepts.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

Figure 7:
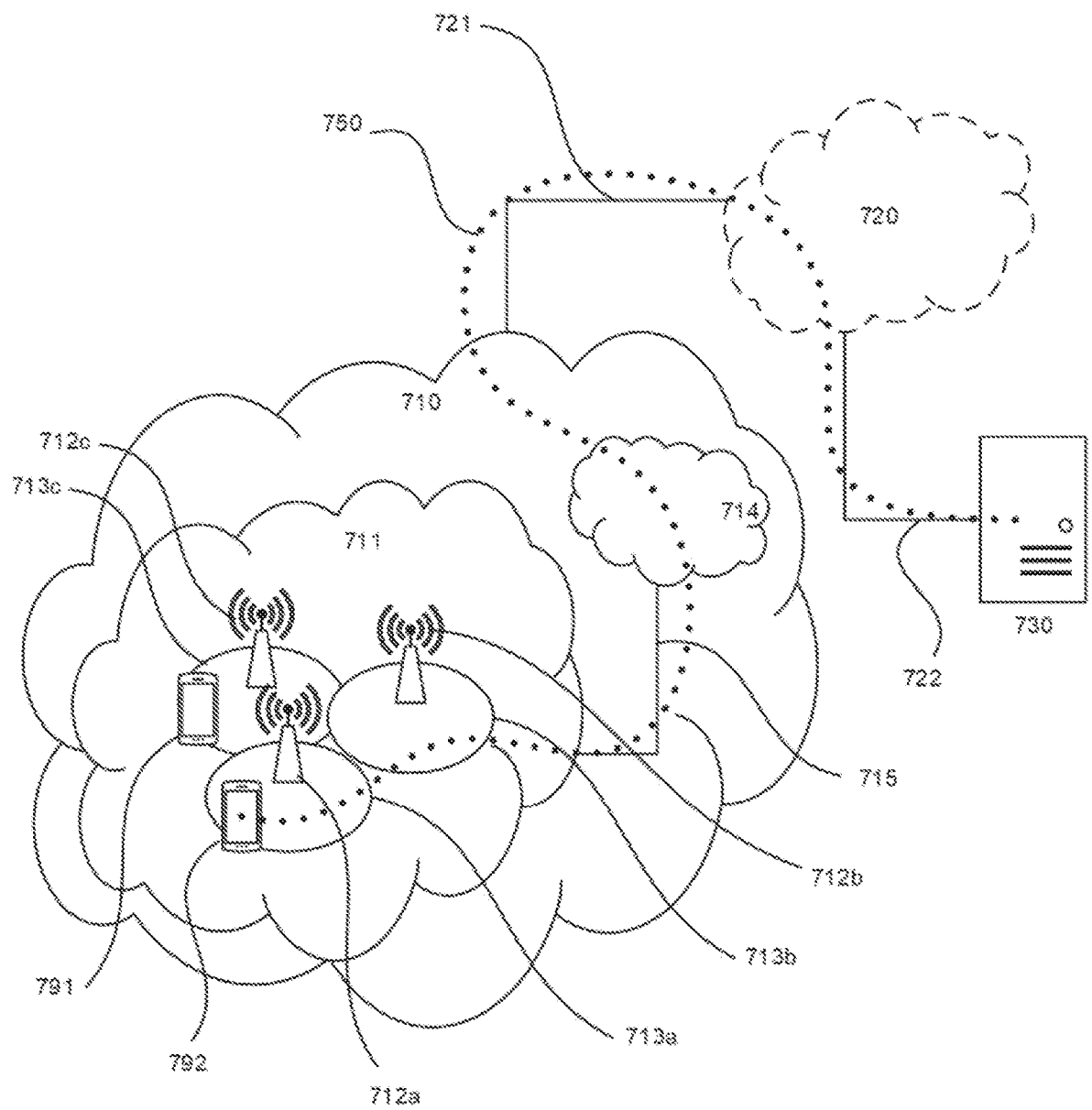
FIG. 7 is a schematic diagram illustrating a telecommunication network connected via an intermediate network to a host computer according to some embodiments of inventive concepts.

In some embodiments, some signaling can be affected with the use of control system 6230 which may alternatively be used for communication between the hardware nodes 630 and radio units 6200. FIG. 7 is a diagram illustrating a telecommunication network connected via an intermediate network to a host computer in accordance with some embodiments of inventive concepts.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
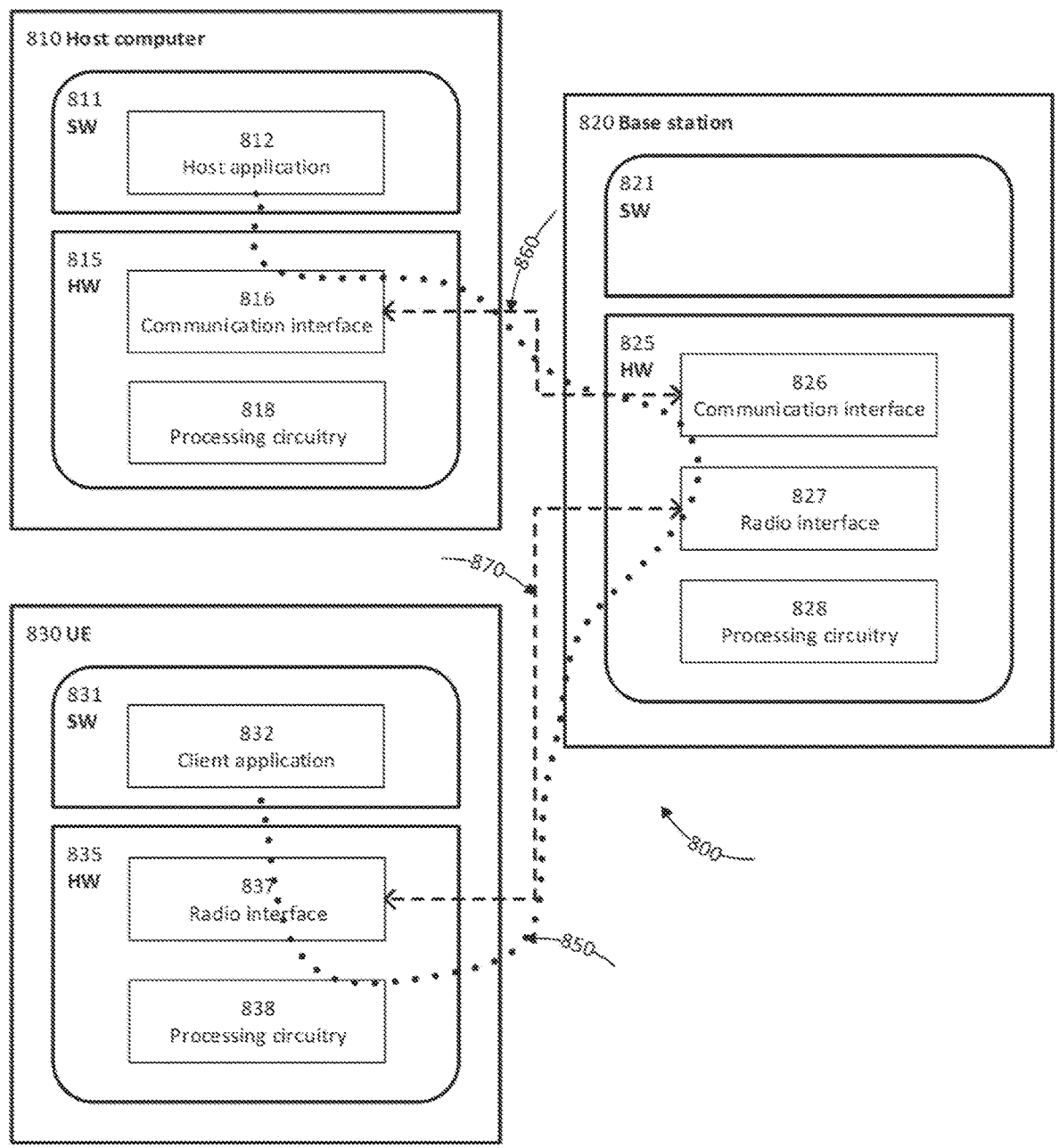
FIG. 8 is a block diagram illustrating a host computer communicating via a base station with a user equipment over a partially wireless connection according to some embodiments of inventive concepts.

FIG. 8 is a diagram illustrating a host computer communicating via a base station with a user equipment over a partially wireless connection in accordance with some embodiments of inventive concepts.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the latency and power consumption and thereby provide benefits such as reduced signaling, reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
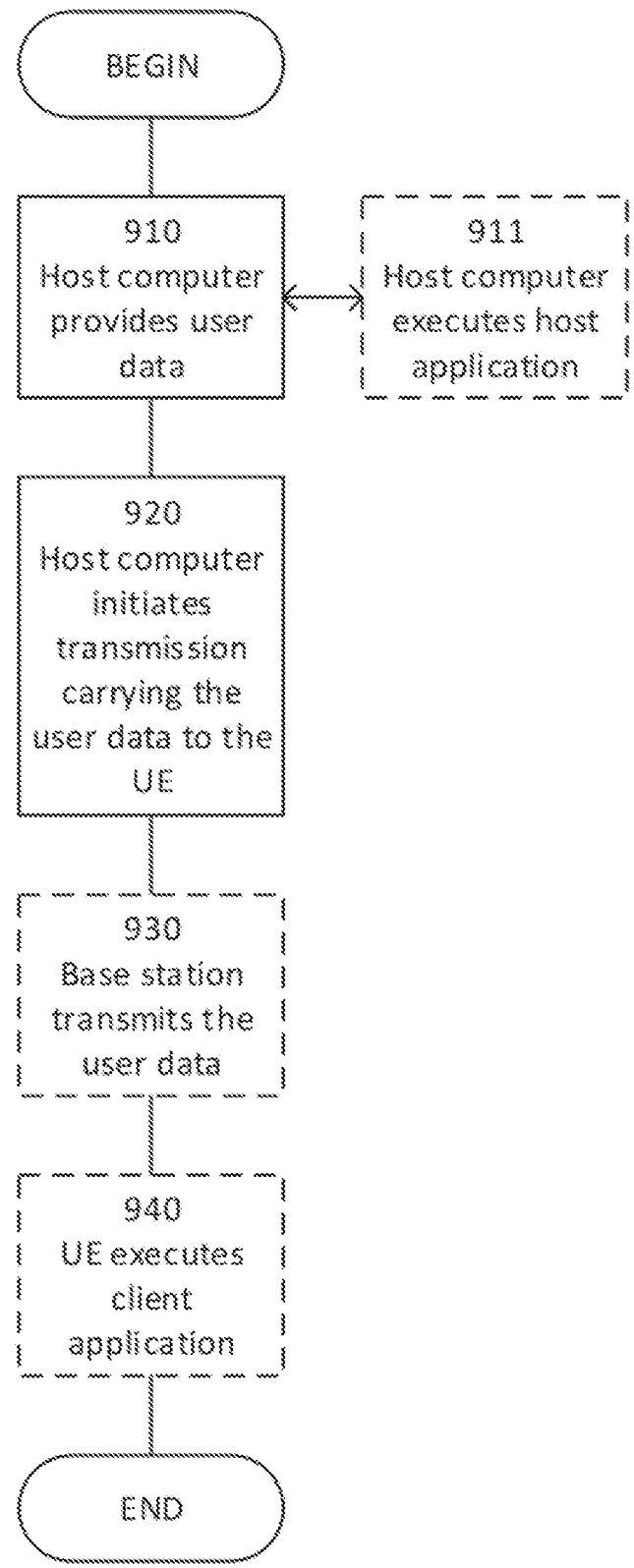
FIG. 9 is a flow chart illustrating methods implemented in a communication system including a host computer, a base station and a user equipment according to some embodiments of inventive concepts.

FIG. 9 is a flow chart illustrating methods implemented in a communication system including a host computer, a base station and a user equipment in accordance with some embodiments of inventive concepts.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
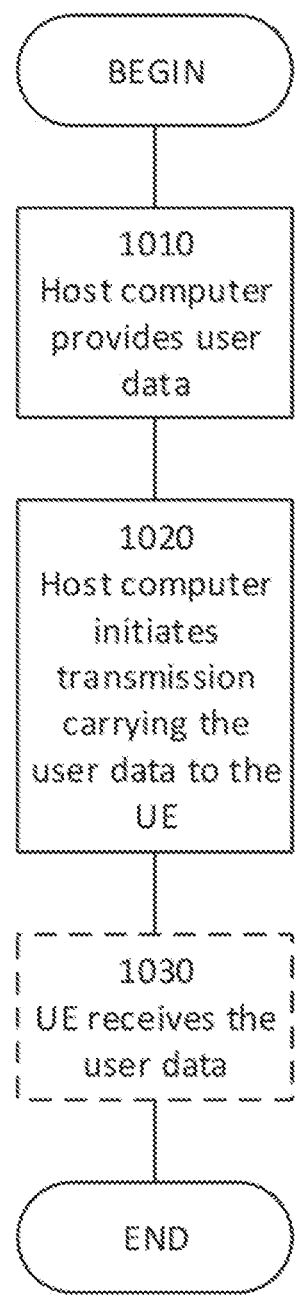
FIG. 10 is a flow chart illustrating methods implemented in a communication system including a host computer, a base station and a user equipment according to some embodiments of inventive concepts.

FIG. 10 is a flow chart illustrating methods implemented in a communication system including a host computer, a base station and a user equipment in accordance with some embodiments of inventive concepts.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
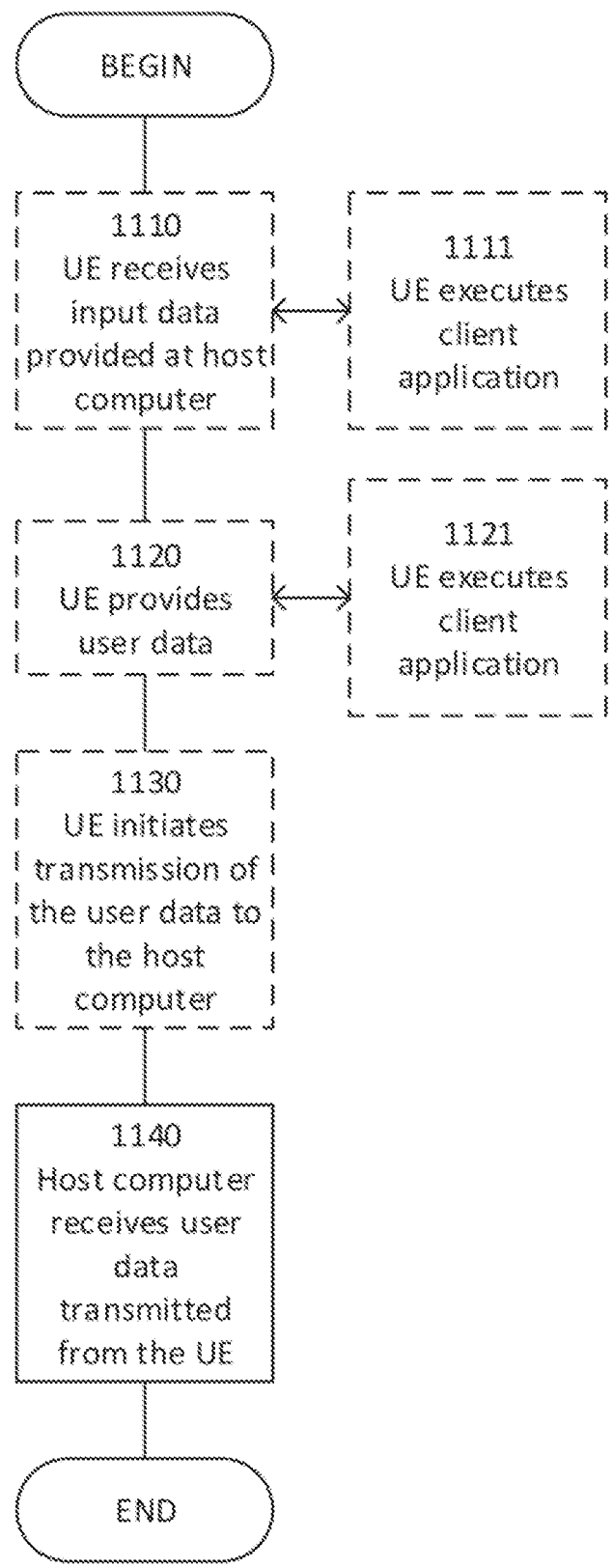
FIG. 11 is a flow chart illustrating methods implemented in a communication system including a host computer, a base station and a user equipment according to some embodiments of inventive concepts.

FIG. 11 is a flow chart illustrating methods implemented in a communication system including a host computer, a base station and a user equipment in accordance with some embodiments of inventive concepts.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12 methods implemented in a communication system including a host computer, a base station and a user equipment in accordance with some embodiments of inventive concepts.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method of operating a radio access network ("RAN") node, the method comprising:
receiving a non-access stratum ("NAS") packet data unit ("PDU") for a wireless device from a core network ("CN") node, the wireless device being in an inactive state in which the wireless device is in a low power mode with discontinuous reception ("DRX");
paging the wireless device in response to receiving the PDU; and
sending a NAS non-delivery message to the CN node in response to failure of the paging for the wireless device, the NAS non-delivery message including an indication that the wireless device is in the inactive state.

2. The method of claim 1, wherein the NAS non-delivery message includes an instruction for the CN node to refrain from resending the NAS PDU for the wireless device.

3. The method of claim 2, wherein the instruction for the CN node to refrain from resending is an instruction for the CN node to refrain from resending the NAS PDU for the wireless device for a period of time following the NAS non-delivery message.

4. The method of claim 2, further comprising:
generating the NAS non-delivery message to include the instruction for the CN to refrain from resending the NAS PDU for the wireless device in response to a high paging load and/or in response to multiple failures of paging for the wireless device.

5. The method of claim 1, wherein the failure of the paging is determined in response to failure to receive a response from the wireless device at the RAN node after initiating the paging.

6. The method of claim 5, wherein the failure of the paging is determined in response to failure to receive a response from the wireless device at the RAN node for a preconfigured time after initiating the paging.

7. The method of claim 1, further comprising:
subsequent to sending the NAS non-delivery message, maintaining a context at the RAN node for the wireless device in the inactive state.

8. The method of claim 1, wherein the inactive state is a Radio Resource Control ("RRC") inactive state.

9. The method of claim 8, wherein the RRC inactive state is a CM-Connected and RRC inactive state.

10. A radio access network ("RAN") node, the RAN node comprising:
processing circuitry; and
memory coupled with the processing circuitry and having instructions stored therein that when executed by the processing circuitry cause the RAN node to perform operations comprising:
receiving a non-access stratum ("NAS") packet data unit ("PDU") for a wireless device from a core network ("CN") node, the wireless device being in an inactive state in which the wireless device is in a low power mode with discontinuous reception ("DRX");
paging the wireless device in response to receiving the PDU; and
sending a NAS non-delivery message to the CN node in response to failure of the paging for the wireless device, the NAS non-delivery message including an indication that the wireless device is in the inactive state.

11. The RAN node of claim 10, wherein the NAS non-delivery message includes an instruction for the CN node to refrain from resending the NAS PDU for the wireless device.

12. The RAN node of claim 11, wherein the instruction for the CN node to refrain from resending is an instruction for the CN node to refrain from resending the NAS PDU for the wireless device for a period of time following the NAS non-delivery message.

13. The RAN node of claim 11, further comprising:
generating the NAS non-delivery message to include the instruction for the CN to refrain from resending the NAS PDU for the wireless device in response to a high paging load and/or in response to multiple failures of paging for the wireless device.

14. The RAN node of claim 10, wherein the failure of the paging is determined in response to failure to receive a response from the wireless device at the RAN node after initiating the paging.

15. The RAN node of claim 14, wherein the failure of the paging is determined in response to failure to receive a response from the wireless device at the RAN node for a preconfigured time after initiating the paging.

16. The RAN node of claim 10, the operations further comprising:
subsequent to sending the NAS non-delivery message, maintaining a context at the RAN node for the wireless device in the inactive state.

17. The RAN node of claim 10, wherein the inactive state is a Radio Resource Control ("RRC") inactive state.

18. The RAN node of claim 17, wherein the RRC inactive state is a CM-Connected and RRC inactive state.

19. A non-transitory computer readable medium having instructions stored therein that are executable by processing circuitry of a radio access network ("RAN") node to cause the RAN node to perform operations comprising:
receiving a non-access stratum ("NAS") packet data unit ("PDU") for a wireless device from a core network ("CN") node, the wireless device being in an inactive state in which the wireless device is in a low power mode with discontinuous reception ("DRX");
paging the wireless device in response to receiving the PDU; and
sending a NAS non-delivery message to the CN node in response to failure of the paging for the wireless device, the NAS non-delivery message including an indication that the wireless device is in the inactive state.

20. The non-transitory computer readable medium of claim 19, wherein the NAS non-delivery message includes an instruction for the CN node to refrain from resending the NAS PDU for the wireless device.

* * * * *